United States Patent Office 3,431,621
Patented Mar. 11, 1969

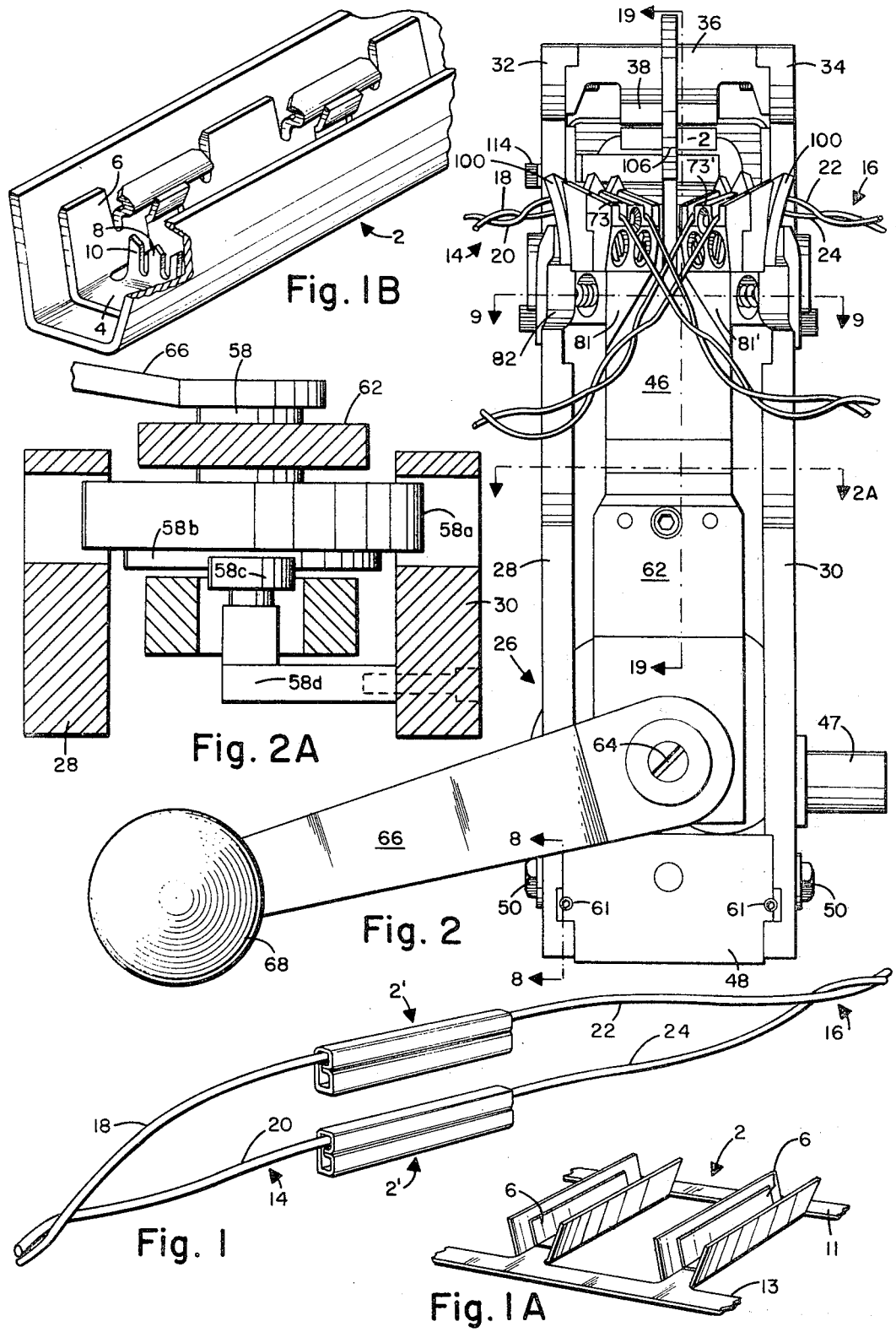

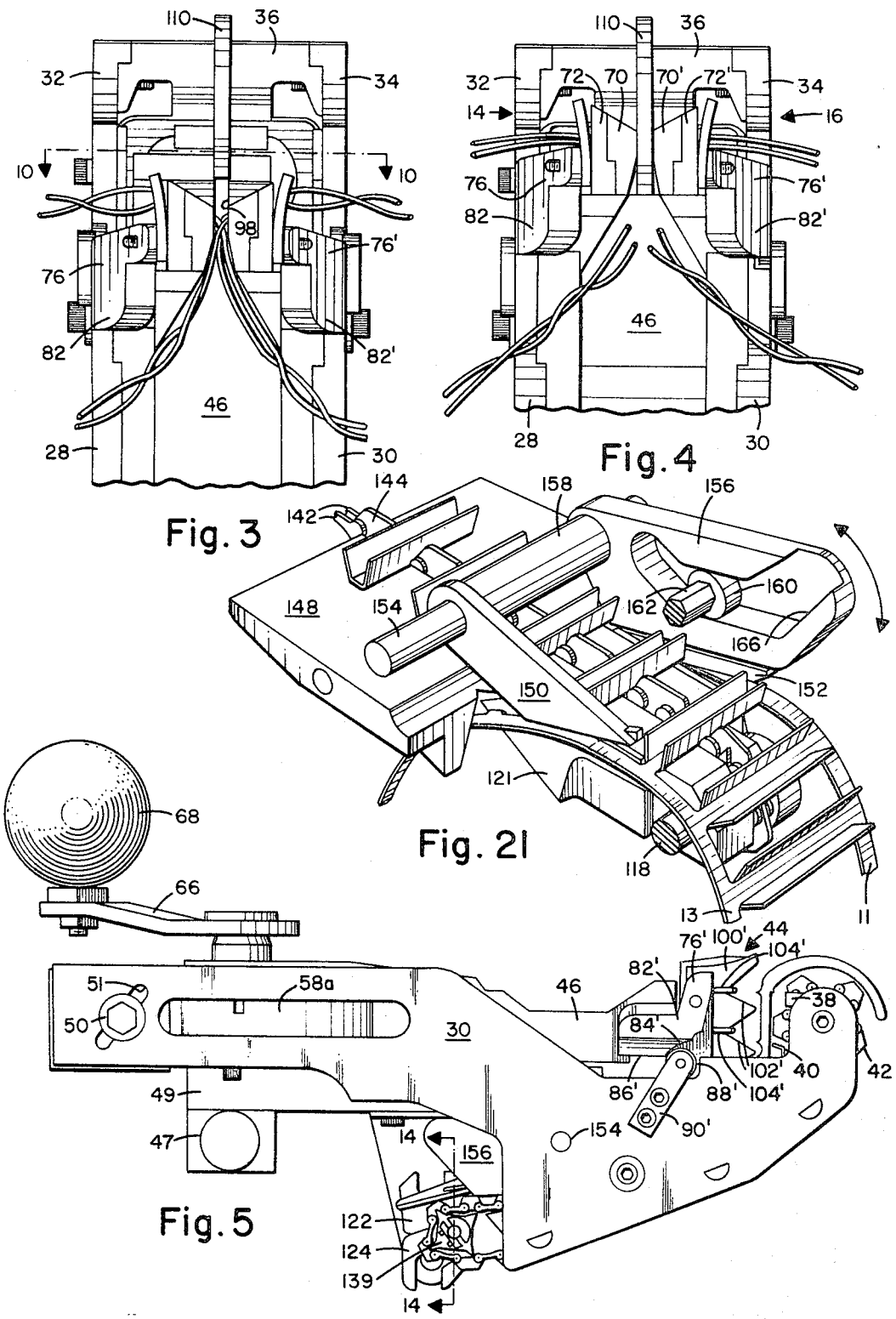

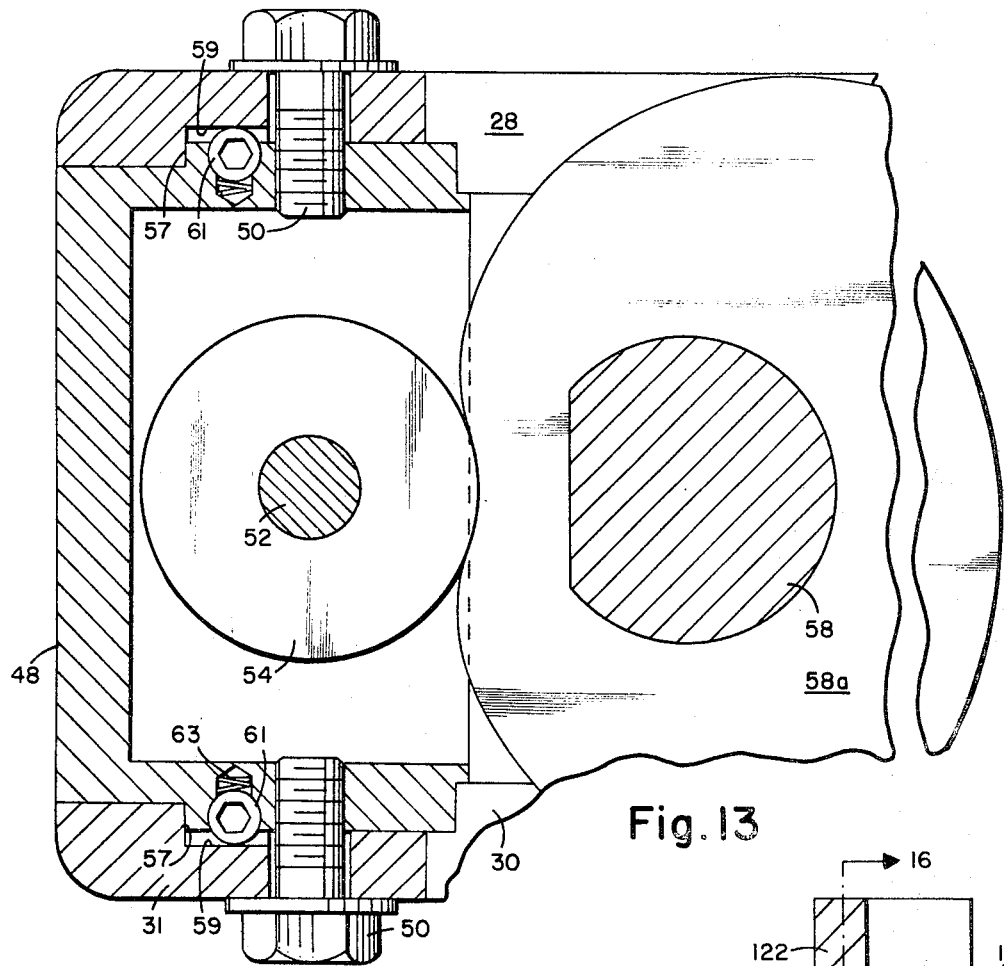
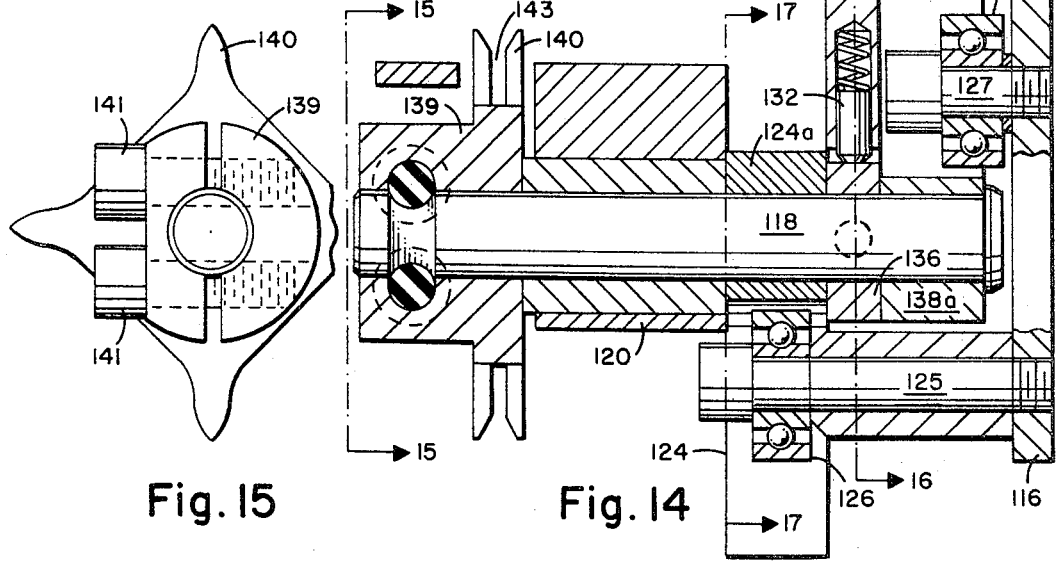
Fig. 13
Fig. 15
Fig. 14

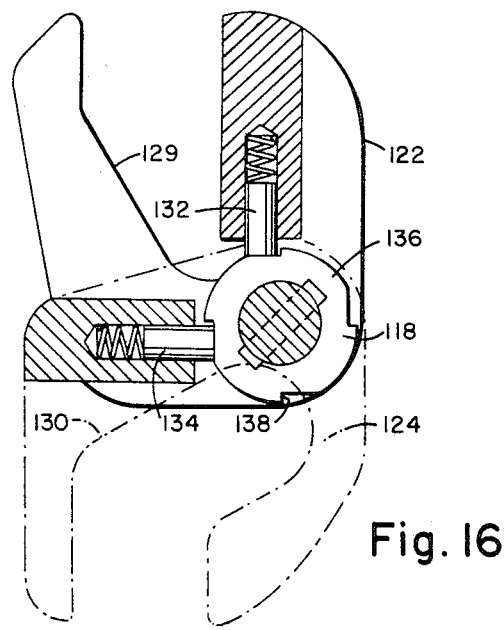
Fig. 16
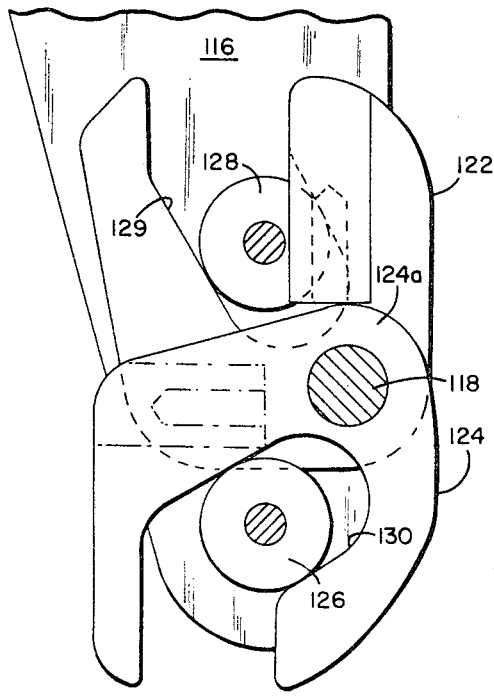 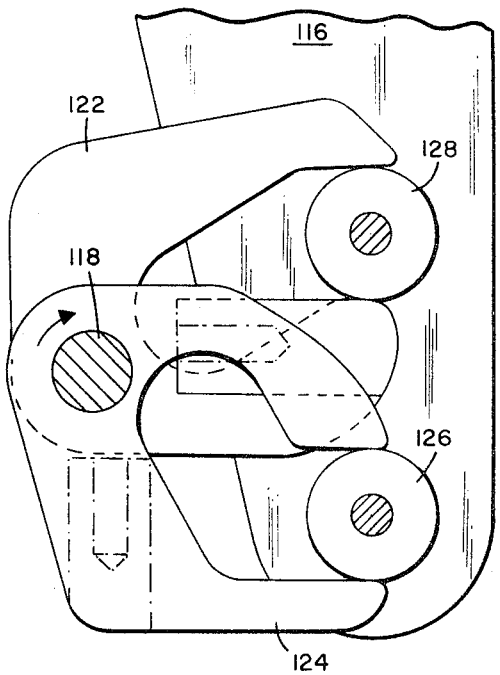
Fig. 17    Fig. 18

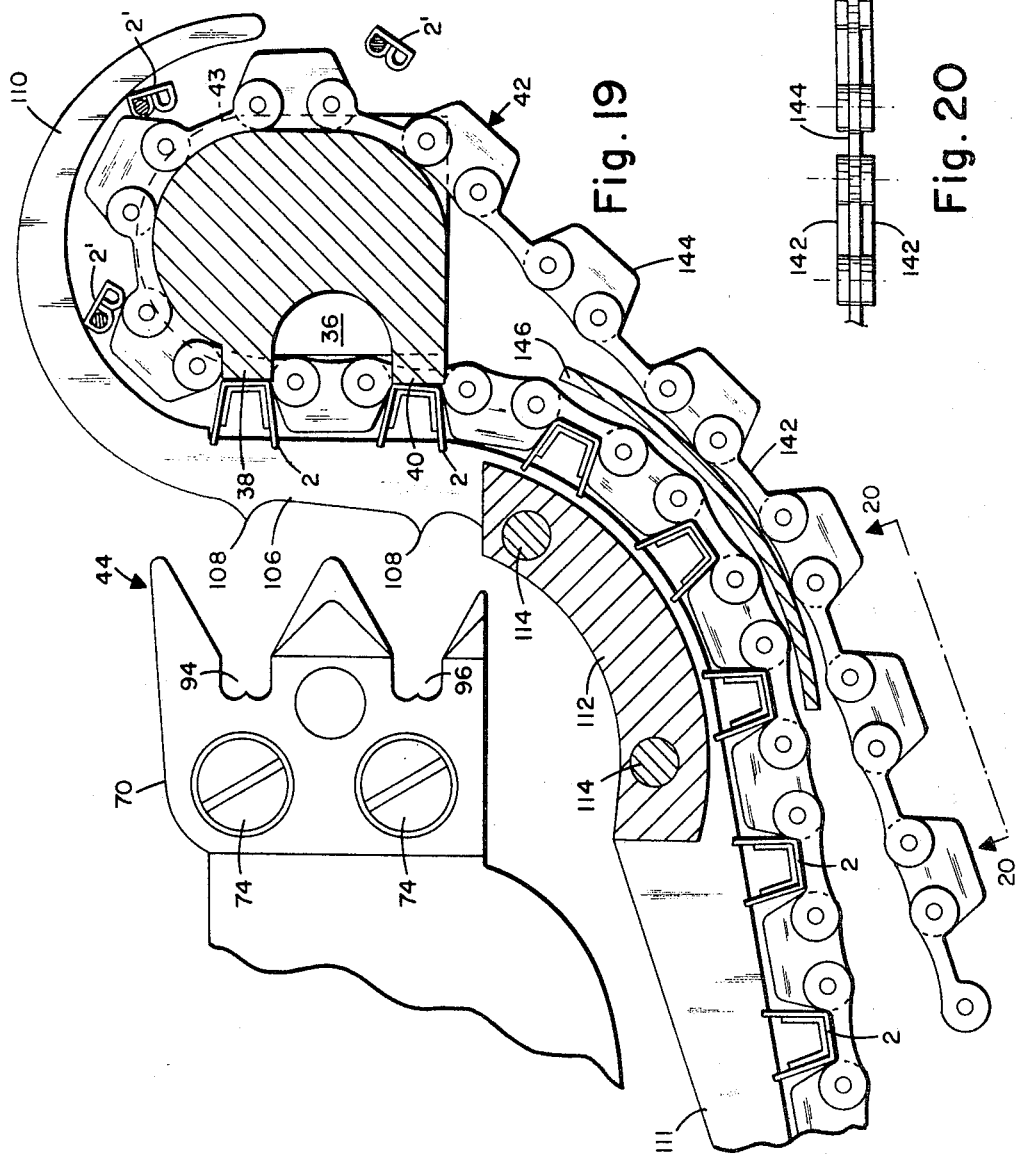

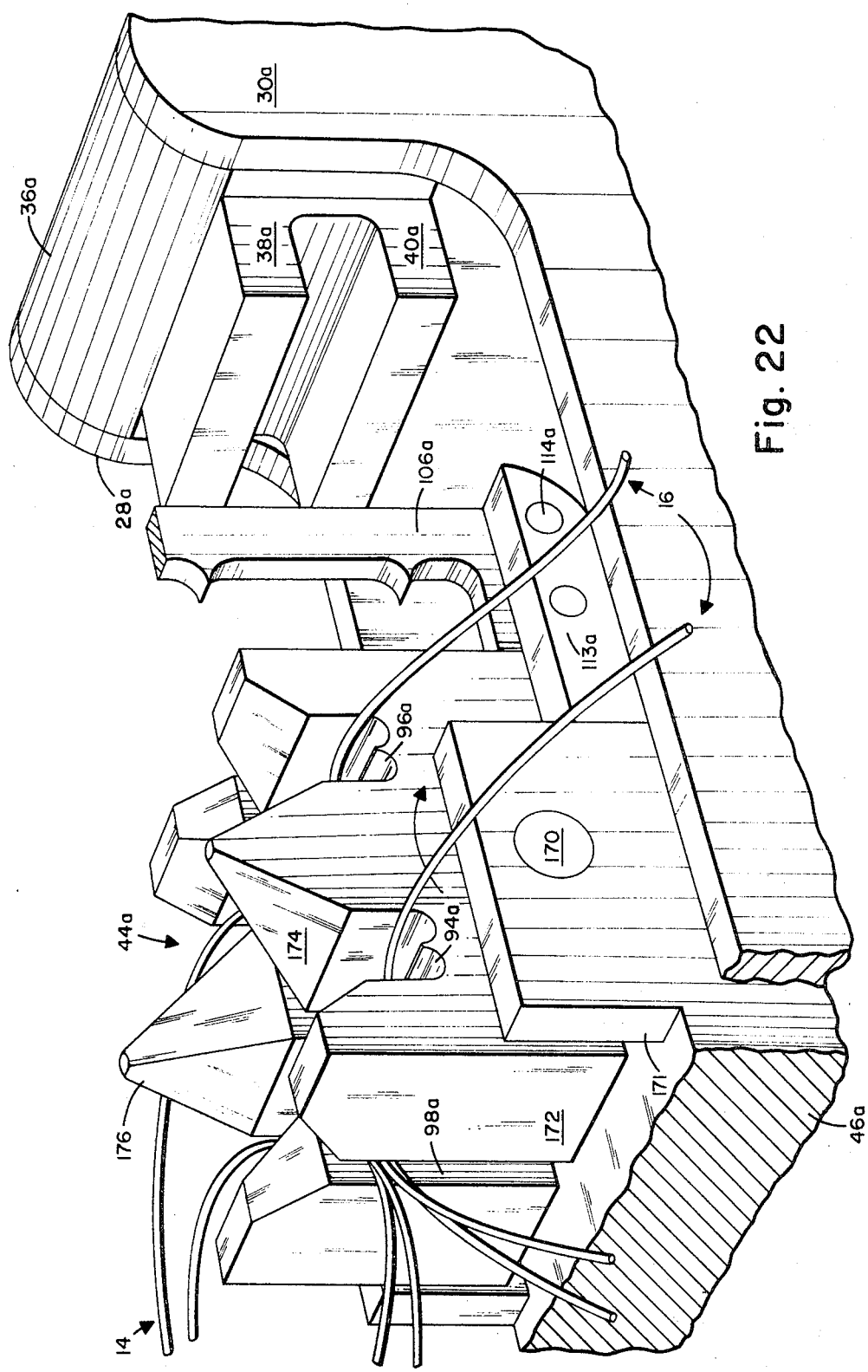

3,431,621
APPARATUS FOR CONNECTING CORRESPONDING WIRES OF PAIRS OF WIRES TO EACH OTHER
Grey Manning Gurley, Clearwater, Fla., and William Roderick Over, Harrisburg, Pa., assignors to AMP Incorporated, Harrisburg, Pa.
Filed Mar. 22, 1967, Ser. No. 625,096
U.S. Cl. 29—203      14 Claims
Int. Cl. H01r 43/04; B21f 15/06

ABSTRACT OF THE DISCLOSURE

Apparatus for trimming and connecting the corresponding wires of two pairs of conductors has two side-by-side crimping anvils and two side-by-side crimping dies which are movable towards and away from the anvils. Dies are opposed to, and face, the anvils as in conventional connector crimping tools; however, dies can be rotated about a transverse axis and oriented such that they are positioned laterally of the path of movement of the dies relatively towards the anvils. This lateral pivotal movement of the dies positions them such that the corresponding wires of the pairs of wires which are to be connected to each other can be located in the dies by the operator stationed in front of the apparatus. During pivoting movement of the dies and subsequent rectilinear movement of the dies towards the anvils, the ends of the wires are crimped and the corresponding wires of the two pairs are connected to each other by means of connectors crimped by the apparatus onto the wires.

CROSS-REFERENCES TO RELATED APPLICATIONS

The embodiments of the invention disclosed and claimed herein are intended to be used with crimpable electrical connectors of the general type disclosed in the copending application of James E. Marley et al., Ser. No. 432,621, filed Feb. 15, 1965, now U.S. Patent No. 3,320,354. The herein disclosed invention is also related to the following pending applications:

Application Ser. No. 457,150 (now abandoned), William R. Over, Howard L. Williams, filed May 19, 1965; application Ser. No. 539,230 (U.S. Patent No. 3,328,872), Richard E. Reem, John R. Vickery, Jr., filed Jan. 7, 1966; application Ser. No. 573,078, William R. Over, filed Aug. 17, 1966; application Ser. No. 596,672, William R. Over, filed Nov. 23, 1966.

BACKGROUND OF THE INVENTION

The herein disclosed embodiments of the present invention are particularly intended to be used for connecting the individual wires in one telephone cable to the individual wires in another telephone cable. Such cables ordinarily contain numerous pairs of individual insulated wires, each pair serving as a single telephone circuit with one of the wires of the pair functioning as a signal conductor and the other wire functioning as a ground conductor. Cables are manufactured in varying sizes, the largest commonly used size cable containing 2,700 pairs or 5,600 individual wires.

It is frequently necessary to splice two cables to each other, an operation which requires that individual electrical connections be made between the corresponding wires in the ends of the cables. For example, when a new cable is being installed, the cable is supplied in sections which are only several hundred feet long. Every several hundred feet then, an additional section must be spliced onto the cable until the desired cable length is achieved. It is also necessary to splice cable ends when the cable has been severed accidentally or by a storm.

In accordance with prior art practice, a splice in a multiconductor telephone cable is made by locating the two cable ends relatively close to each other so that the individual conductors in the cable will overlap. The technician making the splice selects two pairs of wires (one pair in each cable end) which are to be connected to each other. He first connects one wire of one pair to one wire of the second pair by well known twisting techniques or by known types of crimpable connectors. When he connects the wires, he trims them to eliminate the slack or scrap wire. He then repeats the process for the two remaining wires of the pairs and then goes on to another set of pairs. The complete process of splicing two pairs of wires to each other thus requires five steps by this prior art process, namely: (1) selection of the two pairs (one pair in each cable end) which are to be spliced, (2) selection of one wire from each pair for the first connection, (3) trimming of wire ends and forming of first connection, (4) selection of the remaining wires of the two pairs, and (5) trimming of the wire ends and forming the second connection.

The present invention provides an apparatus with which the process of connecting two pairs of wires in two cable ends requires only three steps. These steps are: (1) selection of the two pairs which are to be connected, (2) selection of the corresponding wires of the pairs which are to be connected to each other, and (3) trimming the wire ends and forming the two electrical connections with one operating cycle of the apparatus.

An object of the invention is thus to provide an improved apparatus for connecting wires to each other and trimming the wires during the connecting operation. A further object is to provide an apparatus for connecting the corresponding wires of two pairs of wires, to each other in one operation. A still further object is to provide an apparatus for connecting pairs of wires to each other which results in a substantial time saving on the part of the technician or lineman.

These and other objects of the invention are achieved in a preferred embodiment comprising a splicing apparatus which is intended to be mounted on a suitable work support or stand in front of the two ends of a telephone cable which are to be spliced to each other. The apparatus comprises a pair of crimping anvils disposed in side-by-side relationship and a pair of crimping dies similarly disposed in side-by-side relationship and movable relatively towards and away from the anvils. The dies are mounted on a pivotal axis means which permits them to be selectively oriented in either of two positions when they are remote from the anvils. The arrangement is such that when the dies are thus remote from the anvils, they will be in an orientation in which they are conveniently accessible to the technician who can position the corresponding wires of the two pairs in selected ones of the dies and then cause the dies to pivot on their axes until they face the anvils. The technician thereafter causes the dies to move relatively towards the anvils to affect trimming of the excess or slack wire from the conductors or wires and crimping of electrical connectors supported on the anvils onto the wires.

A significant feature of the invention is that after the operator has identified the two pairs of wires which are to be connected to each other (one pair in the end of each cable) he performs only a single series of manipulative steps to trim all four wires and connect the corresponding wires of the two pairs to each other in separate electrical connections.

In the drawings:

FIGURE 1 is a perspective view of two twisted pairs of wires extending towards each other with the corresponding wires of the two pairs connected to each other by means of crimped electrical connections in accordance with the invention;

FIGURE 1A is a perspective view of a short section of connector strip of the type which is used in one embodiment of the invention;

FIGURE 1B is a perspective view of an electrical connector of the type used with the disclosed embodiment;

FIGURE 2 is a plan view of a preferred form of apparatus in accordance with the invention showing the positions of the parts at the beginning of the operating cycle;

FIGURE 2A is a view taken along the lines 2A—2A of FIGURE 2;

FIGURES 3 and 4 are fragmentary views similar to FIGURE 2 but showing the positions of the parts at successive stages of the operating cycle;

FIGURE 5 is a side view of the tool of FIGURE 1 showing the positions of the parts at the beginning of the operating cycle;

FIGURE 13 is a view taken along the lines 13—13 of FIGURE 12;

FIGURE 14 is a view taken along the lines 14—14 of FIGURE 5 showing the indexing mechanism for the terminal strip feeding means of the apparatus;

Figure 8:
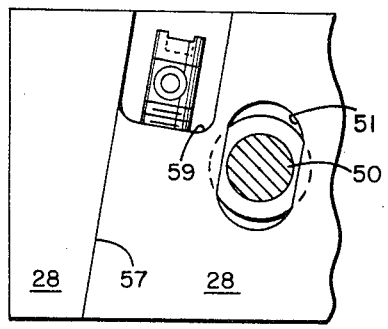
FIGURE 8 is a view taken along the lines 8—8 of FIGURE 2.

FIGURES 15, 16, and 17 are views looking in the direction of the arrows 15—15, 16—16, and 17—17 of FIGURE 14;

FIGURE 18 is a view similar to FIGURE 17 but showing the positions of the parts at a time midway through the operating cycle;

FIGURE 19 is a sectional side view taken along the lines 19—19 of FIGURE 2 showing the crimping zone and the terminal strip feeding mechanism on an enlarged scale;

FIGURE 20 is a plan view taken along the lines 20—20 of FIGURE 19 of the conveyor chain;

FIGURE 21 is a fragmentary perspective view showing a shearing mechanism for shearing the individual connectors from the carrier strip; and FIGURE 22 is a fragmentary perspective view of an alternative embodiment.

The embodiment of the invention disclosed in FIGURES 2–21 is adapted to crimp electrical connectors 2 of the type shown in FIGURES 1A and 1B onto wires. Connectors of this type are more fully disclosed in the above-identified Marley et al. application and comprise in general a metallic web 4 having upstanding sidewalls 6. Two pairs of struck-up tongues are provided on the web and these tongues, each tongue has a pair of spaced-apart side-by-side notches. In FIGURE 1B, one sidewall of the connector is broken away to show one of the tongues 8 and its notches 10. The entire metallic connector is covered by a suitable insulating film such as Mylar (polyethylene terephthalate) which is bonded to the external surface of the connector and which extends upwardly beyond the sidewalls and axially beyond the ends of the connector as shown in FIGURE 1B. These connectors are produced in the form of a continuous ladder strip with the insulating film of the individual connectors being integral with carrier strips 11, 13 of the same film material as shown in FIGURE 1A.

When an electrical connection between two wires is made by means of a connector 2, the individual connector is severed from the strip, the two wires are located between the sidewalls of the connector and in alignment with two of the notches 10 in two of the tongues 8 on opposite ends of the connector. The sidewalls are bent inwardly and downwardly to form a crimped electrical connection 2', FIGURE 1. During crimping, the wires are forced into the notches of the tongues 8 and the edges of the notches penetrate the insulation of the wire to establish electrical contact as described in the above-identified Marley et al. application.

In FIGURE 1, the numerals 14, 16 represent two twisted pairs of wires extending axially towards each other with the corresponding wires of the two pairs connected to each other by means of the crimped connections 2'. Thus, the wire 18 of the pair 14 is connected to the wire 22 of the pair 16 and the wire 20 of the pair 14 is similarly connected to the wire 24 of the pair 16. As will become apparent as this description proceeds, the present invention is directed to a tool or apparatus by means of which the two connections shown in FIGURE 1 between the corresponding wires of the two pairs 16, 14 can be made in one operation.

A preferred form of apparatus (FIGURE 2) 26 in accordance with the invention comprises a spaced-apart side plates 28, 30 having forward ends 32, 34 between which an anvil block 36 extents. This anvil block is secured to the ends 32, 34 of the side plates, and, in cooperation with the other structure described below, maintains the side plates in their spaced-apart relationship. A pair of side-by-side anvils 38, 40 are integral with the block 36 (see FIGURE 19) and face leftwardly as viewed in FIGURES 5 and 19 towards the crimping die structure generally indicated at 44. Individual electrical connectors 2 which have been separated from the carrier strips 11, 13 are delivered to this crimping zone of the apparatus and located on the anvils which support them during the crimping operation. The individual connectors are conveyed to the crimping zone by means of a conveyor chain generally indicated at 42. This chain is indexed along a closed circuit path shown in FIGURE 7 and passes through a relatively narrow guide slot 43, which extends transversely through the anvils centrally thereof and around the surface of the anvil block 36.

Figure 6:
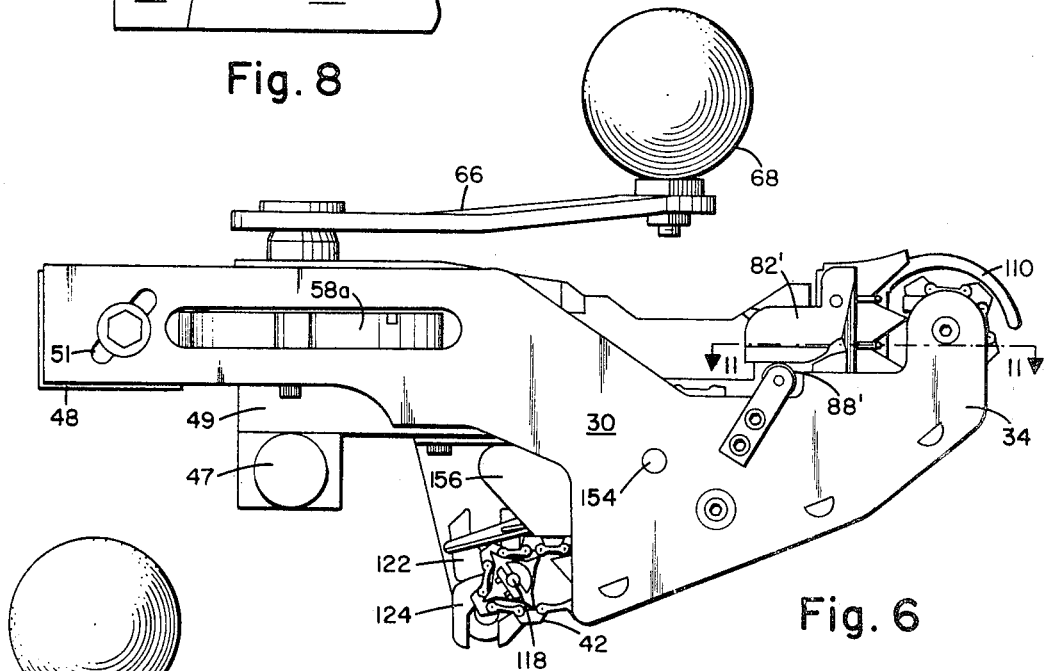
FIGURE 6 is a view similar to FIGURE 5 showing the positions of the parts at the end of the crimping portion of the cycle.
Figure 7:
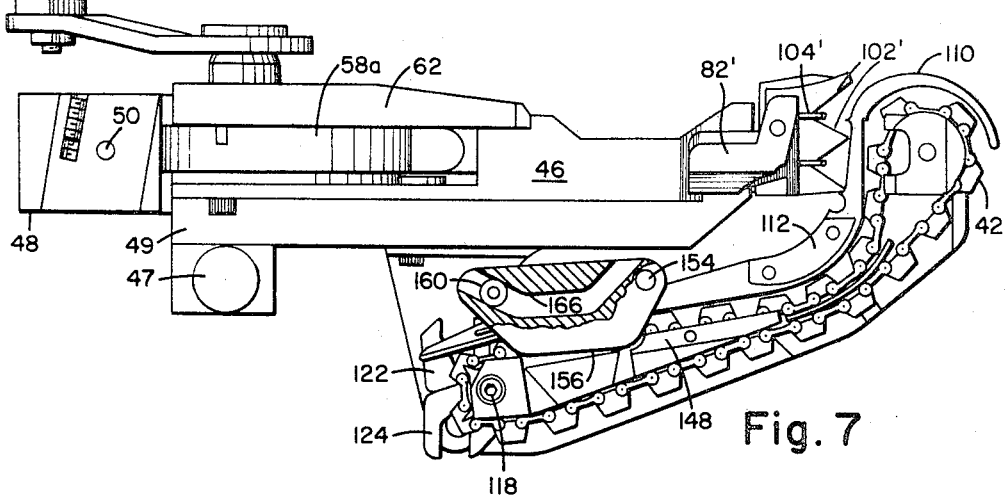
FIGURE 7 is a view similar to FIGURE 5, but with one of the side plates of the apparatus removed.

A relatively heavy frame block or tool body 46 is straddled by the side plates 28, 30 and has a lower section 49 on which there is provided a laterally extending boss 47 by means of which the apparatus can be mounted on a suitable work support of the general type shown in the above-identified application Ser. No. 457,150. During the operating cycle, this tool body 46, 49 remains stationary and the side plates, the anvil blocks, and the anvils, move relatively towards the crimping dies 44 to effect the crimping operation as shown in FIGURES 5–7. This movement of the side plates and the anvil block towards the dies is achieved by means of a cam 58a (FIGURES 2A, 12, and 13) mounted in the frame block 46 at the rearward end thereof. This cam cooperates with a cam follower 54 mounted in a generally rectangular housing 48 contained between the side plates 28, 30. Housing 48 is secured to these side plates by means of fasteners 50 which extend through slots 51 in the side plates. A pin 52 extends between the top and bottom walls 53 of the housing 48 and is secured in position by suitable set screw 55 as shown. The cam follower 54 is rotatably supported on this pin by suitable bearing means 56. The cam 58a is integral with a cam shaft 58 rotatably supported by bearing means 60 in the frame block 46 and has a projecting end which is secured by a fastener 64 to a handle 66 having a ball-like handle 68 on its end.

The shape of the cam 58a is such that during the first portion of each complete rotation of the handle and the cam 58a, the side plates 28, 30 are moved leftwardly as viewed in FIGURE 13 or downwardly as viewed in FIGURE 2 thereby to move the anvils relatively towards the die structure 44. The parts are returned to their starting position by a second cam 58b on the shaft 58 which is engaged with a roller 58c mounted on a suitable pin extending from a bracket 58d (FIGURE 12) which is integral with side plate 28. The contour of the cam 58b is such that during the final portion of the stroke of the handle 66, the side plates are moved rightwardly as viewed in FIGURE 12 to return the parts to their initial positions.

It is desirable to provide a means for adjusting the shut height of the dies and anvils with respect to each other (i.e., the spacing between the dies and anvils at the completion of the crimping operation) for the reason that the crimping of electrical connectors is a precise and exacting operation and must be carefully controlled for best results. If a terminal is overcrimped or undercrimped, an electrical connection which is less than optimum will result. Accordingly, there is provided a means for moving the cam follower 54 towards and away from the cam 58a. This adjusting means takes the form of inclined mating guide ways 57 on the outwardly facing sides of the housing 48 and the side plates 28, 30, see FIGURES 8 and 13. The arrangement is such that if the housing is moved relatively upwardly, the shut-height of the dies relative to the anvils at the end of the crimping stroke will be increased while downward movement of the housing 48 will move the cam follower leftwardly in FIGURE 12 and decrease the shut-height of the dies relative to the anvil. The precise location of the housing 48 and therefore the cam follower 54 can be changed by means of jack screws 61 which are threaded into the opposite sidewalls of the housing 48 and which bear against the floors of pockets 59 on the inner sides of the side plates 28, 30. Advantageously, springs 63 are provided in laterally extending cavities adjacent to the threaded openings which receive the screws 61 to retain the screws against unwanted rotation. The shut-height of the dies relative to the anvils can thus be reduced (i.e., the crimp can be tightened) by merely tightening the screws 61. The shut-height can be increased by loosening these screws and then moving the housing 48 rightwardly as viewed in FIGURE 12.

The embodiment of the invention shown in FIGURE 2 accomplishes the trimming of the wire ends and the crimping of the electrical connectors onto the trimmed ends in the manner generally disclosed and claimed in the previously identified application of Richard E. Reem et al., Ser. No. 539,230. In accordance with the teaching of the Reem et al. application, the crimping die is provided with a transversely extending slot and the wires which are to be connected to each other are positioned in the die cavities with their ends extending through this slot. A shearing member is provided between the die and anvil so that upon movement of the die relatively towards the anvil, the shearing member moves into the slot, shears the end portions of the wires, and the trimmed wire ends are thereafter conected by means of an electrical connector located on the anvil. The embodiment of FIGURE 2 of the present invention has two die members and two anvil members as will be now described and provides means for pivotally moving the dies when they are opened with respect to the anvil to facilitate lacing of the wires in the tool.

Referring now to FIGURES 2, 3, and 9–11, the die means 44 comprises two sections, each section comprising two die blocks 70, 72, and 70', 72'. These die sections are disposed on opposite sides of a centrally disposed cutter bar 106 and have trough-like die cavities 94, 96 (FIGURE 19) on their upper surfaces for reception of the wires. The upper surface 73 of the composite die setcion 70, 72 slopes downwardly and towards the slot 98 between the dies and the upper surface 73' of the die section 70', 72' similarly slopes convergently toward the surface of the lefthand die parts as viewed in FIGURE 11. Since the right hand die section 70', 72' and the structure associated therewith is substantially similar to the lefthand section, 70, 72, only the lefthand section will be described in detail and the same reference numerals, differentiated by prime marks, will be used to identify corresponding parts on opposite sides of the slot 92.

Figure 11:
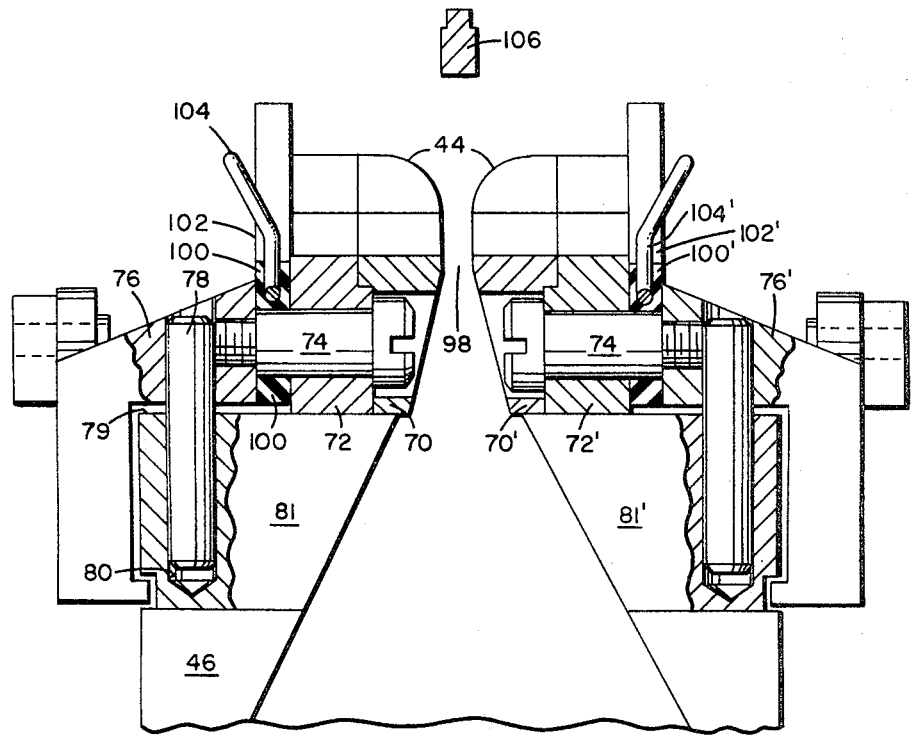
FIGURE 11 is a view taken along the lines 11—11 of FIGURE 6 and showing the manner in which the dies are pivotally mounted on the tool body.
Figure 12:
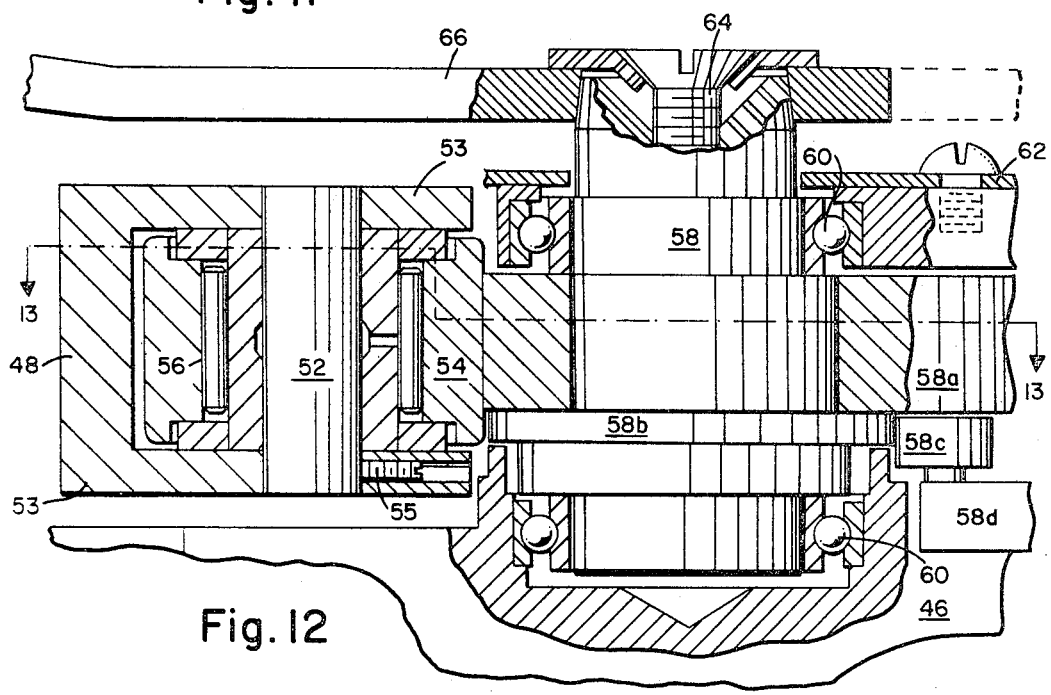
FIGURE 12 is a fragmentary sectional side view of the lower or rearward portion of the tool illustrating the actuating mechanism.

The die blocks 70, 72 are secured by means of screws 74 to a die mounting block 76 which is disposed in front of the right hand end, as viewed in FIGURE 5, of the frame block 46, see FIGURE 11. The mounting block 76 is pivotally supported on a pin 78 which extends through this mounting block and into an opening 80 in a boss 81 on the forward end (the upper end in FIGURE 2) of the main frame block 46. The mounting block 76 and the die member 70, 72 are thus permitted to move pivotally about the axis of the pin 78 between the positions of FIGURES 2 and 3. When the die blocks 70, 72, 70', 72' are in the positions of FIGURE 2, the surface 73, 73' of these die blocks slope generally outwardly from the center of the tool and the slot 98 is relatively wide so that the die cavities are readily accessible to the operator.

Figure 9:
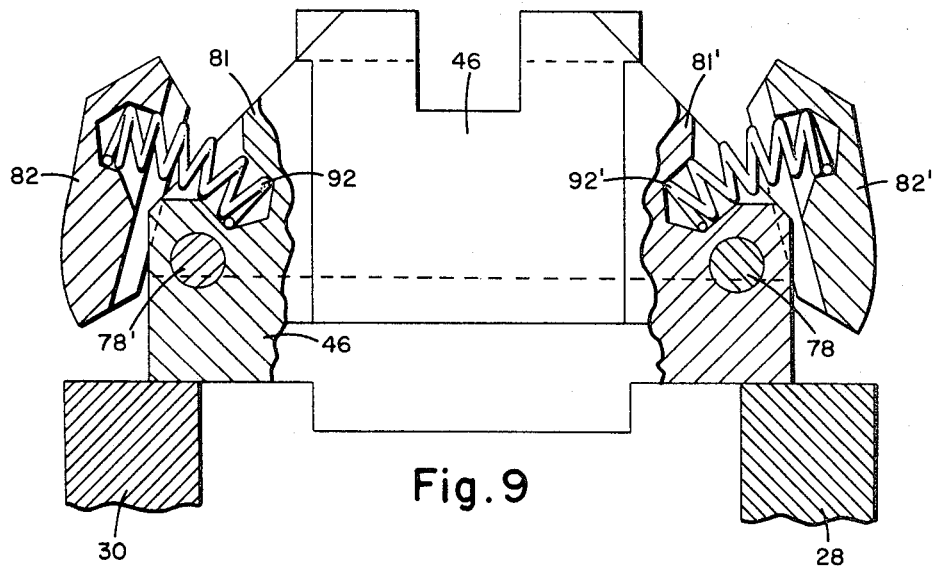
FIGURE 9 is a view taken along the lines 9—9 of FIGURE 2.

Block 76 has a rearwardly extending integral ear 82 (i.e., extending towards the lefthand end of the apparatus as viewed in FIGURE 5) which is normally disposed above the side plate 28. A spring 92 has one end extending into an opening on the outwardly facing surface of the boss 81 of the block 46 and has its other end extending into a recess on the inner surface of the ear 82. As is best shown in FIGURE 9, the spring 92 thus functions to bias the die mounting block 76 outwardly and away from the cutter bar 106; in other words, to bias this block in a counterclockwise direction about the axis of the pin 78 so that it is in the position of FIGURE 2. The spring 92' on the right hand side of the apparatus similarly biases the die mounting block 76' in a clockwise direction and outwardly. Thus, when the parts are in their normal positions and the dies are remote from the anvil, the two die sections 70, 72, and 70', 72' are biased to their opened positions relative to each other. The operator can lace the two wires 22, 24 of the pair 16 in the parts 70', 72' of the right hand die section and he can similarly lace the two wires 18, 20 of the pair 14 in the die cavities of the die section 70, 72. The width of slot 98 between the two dies is, substantially increased when the dies are in the position of FIGURE 2 and the end portions of the wires can be located in this slot easily and without interference from other parts of the tool.

The die sections on the right and left hand sides of the cutter bar 106 are swung inwardly and towards each other from the position of FIGURE 2 to the position of FIGURE 3 by means of rollers 88, 88' mounted on the ends of brackets 90, 90' secured to the side plates 28, 30. These rollers bear against arcuate camming surfaces 84, 84' on the lower edges of the block portions 82, 82' and, during the final portion of the crimping cycle against the lower sides 86, 86' of the block portion 82, 82'. As previously explained, the frame block 46 remains stationary and the side plates and the parts mounted on the side plates move relatively leftwardly as viewed in FIGURE 5 during operation. Such leftward movement of the side plates causes the rollers 88, 88' to move relatively onto the lower sides 86, 86' of the die mounting blocks thereby causing the inward swinging movement of the two die sections towards each other until they reach the positions shown in FIGURE 3. Further relative movement of the side plates with respect to the frame block is, of course, permitted because of the fact that the undersides 86, 86' of the die mounting slides can move relatively over the rollers 88, 88'.

When the parts are in the position of FIGURE 3, the slot 98 between the two pivotally mounted sections of the die is relatively narrow and well defined and has a width only slightly greater than the width of the cutter bar 106. Thus, upon movement of the anvils and the uncrimped connectors mounted on the anvils toward the dies, the cutter bar will move relatively through slot 98 and cut the portions of the wires 22, 24, 18, 20, extending through and beyond the slots. The trimmed wire ends will remain in the die cavities 94, 96. Upon further movement of the anvils towards the dies, the connectors supported on the anvils will be crimped onto these trimmed wire ends in accordance with the teachings of application Ser. No. 539,230, now Patent No. 3,328,872.

It is desired to provide some means for loosely retaining the wires in the die cavities while the anvils are being moved towards the dies. Accordingly, there are provided spacers 100, 100' (FIGURE 11) between the outwardly facing sides of the die sections 72, 72' and the inwardly facing sides of the die mounting blocks 76, 76'. These spacers are advantageously of a yieldable material such as a polyurethane rubber and have V-shaped notches 102, 102' on their ends, the roots of these notches being in alignment with the cavities 94, 96 in the dies. Thin rod-like separating bars 104, 104' are provided in these spacers in alignment with the center lines of the die cavities. When the wires are laced into the tool, the wires can be pulled downwardly as viewed in FIGURE 2 until the entering portions of the wires are clamped between the sides of the notches and the sides of the bar-like pins or separators 104. The wires will thus be loosely clamped during the crimping operation but can be easily extracted from these clamping members without damage at the conclusion of the crimping operation.

Advantageously, the thickness of the spacers 100, 100' is such that the slot 98 has a width slightly less than the width of the cutter bar 106. When the cutter bar moves relatively into the slot, the die sections 72, 72' are pushed apart and the spacers 100, 100' are slightly compressed. The sides of the die sections are, therefore, resiliently urged against the sides of the cutter bar while the wire severing operation is being carried out, an arrangement which ensures clean and effective shearing of the wires.

Figure 10:
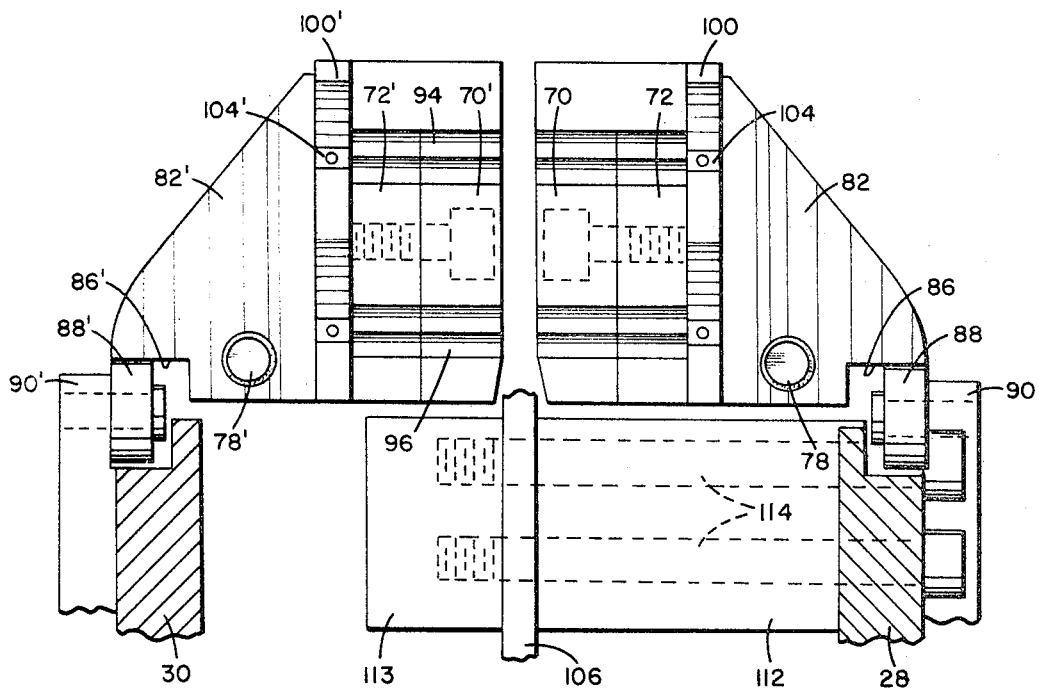
FIGURE 10 is a view taken along the lines 10—10 of FIGURE 3.

Referring to FIGURES 10 and 19, the cutter bar 106 is supported in position in front of the anvil block 36 by means of a plate 112 which is located between the cutter bar and the side plate 28. Screws 114 extend through the side plate 28, through the plate 112, through the cutter bar, and into a clamping block 113 on the opposite side of the cutter bar. It should be noted that the cutter bar has an arcuate extension 110 which projects over and in spaced relationship to the anvil block 36 (FIGURE 19) and has a rearward extension 111 which extends beneath the main body portion 46, 49 of the tool. This rearward extension and the arcuate extension of the cutter bar co-operate with the connector strip feeding and crimped connection delivering mechanism which will be described immediately below.

The disclosed embodiment of the invention is provided with means for feeding a strip of connectors as shown in FIGURE 1A towards the crimping zone, removing the individual connectors 2 from the carrier strips 13, 11, and carrying the finished crimped connections from the crimping zone and delivering them to a location in front of the tool, as shown in FIGURE 1, that is, to the right of the tool as viewed in FIGURES 19 and 5. As previously mentioned, the disclosed embodiment of the invention is intended to be used by a technician splicing a cable and will normally be mounted on a suitable work support in front of the cable with the right hand end of the tool as viewed in FIGURE 5 disposed adjacent to the cable.

The uncrimped connectors are carried to the crimping zone and the crimped connections are carried from the crimping zone, by means of the previously identified conveyer chain 42 (FIGURES 7 and 19) which comprises alternate single links 144 coupled at each end to pairs of side-by-side links 142. The single links 144 have sloping sides such that adjacent sides of adjacent links define notches conforming to the cross section of the connectors. Connectors can thus be carried by the chain and the crimped connections carried from the crimping zone as illustrated in FIGURE 19.

Referring now to FIGURES 14, 16, 17, and 18, the chain 42 is indexed by a socket wheel 139 having teeth 140. These teeth are slotted as shown at 143 and the single links 144 of the chains are adapted to enter these slots. Sprocket 140 is mounted on a shaft 118 by means of a split hub which is clamped to the shaft by screws 141. The shaft 118 is supported for rotation in an extension 120 of a plate 148 (FIGURE 21) which extends between, and is secured to, the opposed faces of the side plates 28, 30 so that it moves with the side plates during the operating cycle. Shaft 118 is indexed by means of a pair of rollers 126, 128 mounted on the ends of shafts 125, 127 which extend from, and are secured to, a depending flange 116. The flange 116, in turn, is secured to the frame part 49 and is therefore stationary during the operating cycle. The roller 126 is received in a slot 130 in a first indexing arm 124. This arm 124 has an integral bearing portion 124a on the shaft 118 and has an offset relatively heavy or thick section in which there is provided a spring biased detent 134 in engagement with a ratchet wheel 136. The roller 128 is received in a similar slot 129 in an indexing arm 122 which has a bearing portion 138a mounted on the shaft 118 and a detent 132 in a thick section of the arm as shown in FIGURE 16. The bearing portions 124a, 128a of these two arms are on opposite sides of the ratchet wheel 136 as viewed in FIGURE 14 and the relatively heavy sections of the arms in which the detents 132, 134 are mounted are offset relative to these bearing portions so that the detents are against the periphery of the ratchet wheel 136.

It will be apparent from FIGURES 16 and 17 that if either of the arms 122, 124 is moved in a clockwise direction about the axes of the shaft 18, the detents 132, 134 will cause indexing of the shaft. However, counterclockwise direction or movement of either of the arms will not affect the ratchet wheel.

The rollers 126, 128 cause each of the arms to move in a clockwise direction and then in a counterclockwise direction during the operating cycle in a manner such that the shaft 118 is indexed 90° during the first portion of the operating cycle and is indexed an additional 90° during the second portion of the operating cycle to feed the connector strip a distance equal to two pitches of the strip.

Referring specifically to FIGURE 17, at the beginning of the operating cycle, the parts will be as shown in this figure with the arm 122 extending substantially vertically upwardly and with the arm 124 extending downwardly and obliquely leftwardly. During the initial portion of the operating cycle when the anvils and side plates are moved relatively towards the dies, the shaft 118 which is movable with the side plates 28, 30 will move leftwardly from the position of FIGURE 17, to the position of FIGURE 18 while the flange 116, which is mounted on the stationary frame, will remain stationary. The leftward movement of the shaft 118 relative to the rollers 126, 128 causes the indexing arm 122 to be rotated through a 90° angle in a clockwise direction thereby causing a 90° indexing of the shaft by virtue of the pawl detent arrangement described above. The indexing arm 124 will, during this interval, be rotated through a 90° arc in a counterclockwise direction, however, as noted above, counterclockwise direction of either arm is not effecting to rotate the shaft. After the terminals have been crimped, and while the side plates are being returned to their initial positions, the shaft 118 will move rightwardly from the position of FIGURE 18 back to the position of FIGURE 17 and again, the rollers 126, 128 will remain stationary.

During this interval, the indexing arm 122 will be rotated through a 90° angle in a counterclockwise direction and the indexing arm 124 will be rotated through a 90° arc in a clockwise direction. The clockwise rotation of the arm 124 will again cause indexing of the shaft by 90° while the counterclockwise rotation of the arm 122 will have no effect on the shaft.

From the foregoing, it will be apparent that the connector strip is fed a distance equal to one pitch, that is, the spacing between adjacent connectors on the strip, during movement of the anvils towards the crimping dies and is fed an additional pitch during movement of the anvils away from the dies. Thus, the feeding of the strip for a given operating cycle takes place partially during that given operating cycle and partially during the immediately preceding cycle.

FIGURE 21 shows the mechanism for severing the individual connector from the carrier strips 11, 13 at the location where the strip enters the underside of the apparatus and is picked-up by the conveyor chain 42. This mechanism comprises a pair of shearing blades 150, 152 located beside the extension 121 of the plate 148. Blade 150 extends from a sleeve 158 which is rotatably mounted on a rod 154, the ends of which are supported in the side plates 28, 30. Blade 152 is mounted on the underside of a camming plate 156 which is also secured to the sleeve 158. The chain 42 passes through a suitable groove in the upper surface of plate 148 and beneath the sleeve 158 as shown. The width of the extension 121 is substantially equal to the length of the connectors so that the carrier strips 11, 13 are located beside this extension and beneath the blades 150, 152.

The carrier strips are severed from the connectors upon downward movement of the severing blades 150, 152 relative to the extension 121. Such downward movement is achieved by means of a cam track 166 in a plate 156. A roller 160 is disposed in this cam track and mounted on a shaft 162 which is supported in the stationary frame block 46. Cam track 166 is generally arcuate having its lowest section (relative to the plate 148) intermediate its ends. By virtue of this arrangement, the plate 156 is swung through a slight arc and then returned to its normal position whenever the plate is moved in either direction relative to the roller 160. When the plate is moved through an arc about the axis of rod 142, both cutters are moved downwardly relative to the extension 121 to shear a connector from the carries strips.

The plate 156 moves relative to the roller 160 during each operating cycle since the plate is carried by the side plates and the roller is carried by the stationary frame portion of the apparatus. FIGURE 21 shows the positions of the parts when the plate 156 is being lifted by the roller, the position they will occupy once during each stroke, that is, when the anvils have travelled partially towards the die before crimping takes place and again when the dies are partially returned to their initial position after crimping takes place.

It will be recalled from the discussion presented above, that feeding takes place in two steps, one step being carried out immediately before crimping and the other step being carried out immediately after crimping. The shearing operating is similarly carried out before and after crimping and concomitantly with the feeding steps.

The operation of the embodiment of FIGURE 2 is as follows: the parts will normally be in the position of FIGURE 2 with the two parts or sections of the die facing obliquely with respect to the centerline of the tool as shown. The operator first takes one of the pairs 16, spreads the wires slightly, and positions one wire in each of the die cavities of the right hand die section 70′, 72′. He then takes the pair 14, spreads the wires 18, 20 apart and positions one of the wires in each of the die cavities of the die sections 70, 72. If he wishes to connect the wire 22 to the wire 18, he must position the wire 22 in the rearward die cavity of the die section 70, 72 and then he must position the wire 18 in the rearwardmost die cavity of the die section 70, 72. The wires 20, 24 will, of course, be positioned in the forward cavities of the two sections of the die. The operator then merely turns the crank 66 through a complete revolution to cause pivotal movement of the dies until they assume the position of FIGURE 3 and then movement of the dies as a unit towards the anvils (FIGURE 4) to cause relative movement of the cutter bar through the slot 98 with concomitant shearing wires and crimping of the electrical connectors onto the trimmed wire ends. During the portion of the stroke of the crank or handle 66, the anvils are returned to their initial positions. The feeding of the connector strip is described immediately above and it is not believed that it need be described in further detail here.

An immediately apparent advantage of the invention is that both wires in two pairs of wires are connected in one operating cycle. This fact, in itself, results in a substantial time saving in that one crimping operation which was required with previously known tools is eliminated. The time saving achieved is not, however, limited merely by the fact that two operations are carried out simultaneously, but is enhanced by virtue of the fact that the technician or lineman deals with the wires as pairs rather than as individual wires. In other words, after the lineman has identified the pairs 14, 16 in the cable bundle and has determined that he wishes to connect the corresponding wires of these pairs to each other, he need only position the wires in the apporpriate die cavities of the die sections on opposite sides of the cutter bars described above. He does not connect the wire 22 to the wire 18 and then go through a second identification process before connecting the wire 24 to the wire 20. In other words, one identification process for the pairs 16, 14 serves for both of the electrical connections made. This feature of the invention has the advantage of substantially reducing the possibility of error which might occur if an operator might connect the wire 18 to the wire 22 in one connecting step and then connect the wire 20 to some wire other than the wire 24 in a second connecting step. Mistakes of this type sometimes happen because of the fact that the lineman must, after making one electrical connection, go back and identify the proper wire of the proper pairs before making the second connection. This possibility of wiring error is substantially reduced where the wires are delt with as pairs rather than as individuals in a pair.

FIGURE 22 schematically shows an alternative embodiment of the invention in which the crimping die structure 44a is pivoted on an axis 170 which extends transversely of, rather than parallel to, the path of relative movement of the die structure and the anvils towards each other. In the description of this embodiment, the reference numerals used above to describe the embodiment of FIGURE 2 are used with the postscript "a" to identify corresponding parts. The anvils 38a, 40a are integral with and extend from an anvil block 36a. This block extends between, and is secured to, the side plates 28a, 30a. The die means 44a comprises a single block 172 mounted on a pin 170 which extends between a pair of ears 171 integral with the frame block 46a. The cutter bar 106a is supported on a suitable bracket means extending from the side plate 28a and is held in position by means of fasteners 114a, and a clamping block 113a. The arrangement is thus substantially similar to that of the previously described embodiment.

Die block 172 has spaced-apart trough-like die cavities on its upper side as viewed in FIGURE 22 and the slot 98a extends inwardly from the upper side of the block 172 and intersects these cavities. Advantageously, pyramid like projections 174, 176 project upwardly from this upper side to assist the operator in locating the wires of the pairs 14, 16 in the appropriate die cavities. The block 172 can be rotated 90° about its pivotal axis from its position shown in FIGURE 2 so that the die cavities are opposed to, and face, the surfaces of the anvils 38a, 40a.

In use, the parts will normally be in the position shown in FIGURE 22. The operator first separates the two wires of the pairs 16 and the two wires of the pair 14, positions the wires in the appropriate die cavities and leads the end portions of the wires leftwardly through the slot 98a. He then rotates the anvil block 172 through a 90° angle in a clockwise direction as viewed in FIGURE 22 about its pivot axis 170 so that the die cavities will be opposed to and face the connector supporting surfaces of the anvils 38a, 40a. He then operates the actuating mechanism, which may be a cam as described in the previous embodiment, to move the anvils and the cutter bar relatively towards the die block 172. During such movement, the cutter bar 106a moves relatively into the slot 98a and severs the wires in the planes of the sides of this slot. Upon further movement of the anvils towards the die block, connectors supported on the anvils are crimped onto the trimmed ends of the wires.

It will thus be apparent that the die structure can be pivoted about an axis which extends transversely of the path of movement of the dies towards the anvils or about an axis which extends parallel to this path. Obliquely extending pivotal axes for two part die structures of the type shown in the embodiment of FIGURE 2 can also be used if desired. Any of these arrangements offer the advantage of orienting the die block relative to the technician such that the die cavities are readily accessible and the wires can be placed in the die cavities with ease and facility.

While the previously disclosed embodiments of the invention comprise crimping tools which form the electrical connections by means of crimpable connectors, it will be apparent that the principles of the invention might be used with other types of wire joining devices. For example, a welding apparatus can be provided with pivoted electrodes corresponding to the pivoted die means for the instant device. Such an apparatus would offer the advantages of rapid wire lacing or positioning and trimming of the wire ends concomitantly with the connecting process.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. Apparatus for electrically connecting the corresponding wires of two pairs of wires comprising, a pair of crimping anvils and a pair of crimping dies, said dies being disposed in close proximity to each other and said anvils being disposed in close proximity to each other and said anvils being movable relatively towards and away from each other during a working stroke from an open position to a closed position, said dies being reorientable, when said dies and anvils are in their open position, from a first orientation to a second orientation, said dies, in said first orientation, being disposed laterally of said path, said dies in said second orientation, facing along said path whereby said wires can be readily positioned in said apparatus when said dies are in said first orientation.

2. Apparatus for connecting the corresponding wires of two pairs of wires to each other, said apparatus comprising a first pair of side-by-side wire joining members and a second pair of side-by-side wire joining members, said pairs being normally opposed to each other and being movable relatively towards and away from each other along a predetermined path, corresponding joining members of said pairs being cooperable with each other to electrically join a pair of wires upon movement of said pairs towards each other, said joining members of said first pair having means for retaining wires therein, mounting means for said first pair of joining members, said mounting means permitting lateral movement of said first pair of joining members with respect to said path when said first pair is remote from said second pair whereby said wires can be facilely positioned in said first pair of joining members.

3. Apparatus as set forth in claim 2 wherein said first pair of joining members comprises a pair of connector crimping dies, said second pair of joining members comprising a pair of crimping anvils, said wires being electrically joined upon relative movement of said dies towards said anvils by electrical connectors which are supported on said anvils.

4. Apparatus as set forth in claim 2 wherein said mounting means for said first pair of wire joining members comprises pivot means, said first pair of wire joining members being rotatable about said pivot means to permit said lateral movement.

5. Apparatus as set forth in claim 4 wherein said first pair of wire joining members comprises two sections which are separable in a plane extending parallel to said path and transversely of the axis of the wires being joined, said pivot means comprising a pivot axis for each of said sections, said pivot axis extending parallel to said predetermined path.

6. Apparatus as set forth in claim 4 wherein said pivot means comprises a pivot axis for said first pair of wire joining members, said pivot axis extending normally of said predetermined path.

7. Apparatus for trimming the ends of two pairs of wires and connecting the corresponding wires of the two pairs to each other, said apparatus comprising a first pair of side-by-side wire joining members and a second pair of side-by-side joining members, said pairs being normally opposed to each other and being movable relatively towards and away from each other along a predetermined path, corresponding joining members of said pairs of joining members being cooperable with each other to electrically join a pair of wires upon movement of said pairs of joining members towards each other, said joining members of said first pair having means for retaining wires therein, mounting means for said first pair of joining members, said mounting means permitting lateral movement of said first pair of joining members with respect to said path when said first pair is remote from said second pair whereby said wires can be facilely positioned in said first pair, and wire severing means on said path cooperable with said first pair of joining members to trim said wires during relative movement of said first pair towards said second pair.

8. Apparatus as set forth in claim 7 wherein said first pair of joining members comprises a pair of connector crimping dies, said second pair of joining members comprising a pair of crimping anvils, said severing means comprising a slot in said dies extending transversely therethrough and parallel to said path, and said severing means further comprising a shearing member disposed on said path and between said dies and anvils, said shearing member being movable relatively into said slot whereby, upon positioning said wires in said dies with the end portions of said wires extending through said slot and upon relative movement of said severing member into said slot, the end portions of said wires are severed in the planes of the sides of said slot.

9. Apparatus as set forth in claim 8 wherein said mounting means comprises pivot means, said dies being rotatable about said pivot means to permit said lateral movement.

10. Apparatus as set forth in claim 9 wherein said dies are provided in two sections, one section being provided on each side of said slot, said pivot means comprising a pivot axis for each of said sections, said pivot axes extending parallel to said path on each side of said slot, said lateral movement of said dies comprising pivotal movement about said axis.

11. Apparatus as set forth in claim 9 wherein said dies are provided on a die block, said pivot means comprising a pivotal axis for said die block extending transversely of said path.

12. In an apparatus for trimming the ends of the wires of two pairs of wires and concomitantly connecting the corresponding wires of said pairs to each other, said apparatus comprising a pair of side-by-side crimping dies and a pair of side-by-side crimping anvils, said dies being normally opposed to said anvils and being movable relatively towards and away from said anvils along a predetermined path, a wire-receiving slot in said dies intermediate the ends of said dies extending transversely of the axes of said dies, and a shearing member normally disposed between said dies and anvils and movable relatively into said slot to trim wire end portions extending into said slot, the improvement to said apparatus comprising: pivotal mounting means for said dies, said dies being pivotally movable between a loading orientation and a crimping orientation, said dies being disposed laterally of said path for purpose of accessability when in said loading orientation and being disposed on said path and facing said anvils in said crimping orientation.

13. Apparatus as set forth in claim 12 wherein said dies are formed in two sections, one section lying on each side of said slot, said pivotal mounting means comprising a pivot axis for each of said dies, said axes extending parallel to said path and being on opposite sides of said slot.

14. Apparatus as set forth in claim 12 wherein said pivotal mounting means comprises a pivot axis for said dies extending transversely of said path.

References Cited

UNITED STATES PATENTS 3,328,872   7/1967   Reem et al. _____ 29—203

RICHARD H. EANES, JR., *Primary Examiner.*

U.S. Cl. X.R.

29—33

UNITED STATES PATENT OFFICE
CERTIFICATE OF CORRECTION

Patent No. 3,431,621

March 11, 1969

Grey Manning Gurley et al.

It is certified that error appears in the above identified patent and that said Letters Patent are hereby corrected as shown below:

Column 11, line 56, cancel "and said anvils being movable relatively towards" and insert -- said dies and anvils being movable relatively towards --

Signed and sealed this 31st day of March 1970.

(SEAL)
Attest:

Edward M. Fletcher, Jr.
Attesting Officer

WILLIAM E. SCHUYLER, JR.
Commissioner of Patents